C. W. CARROLL.
VALVE FOR AIR BRAKE SYSTEMS.
APPLICATION FILED JUNE 24, 1910.
1,011,318.
Patented Dec. 12, 1911.
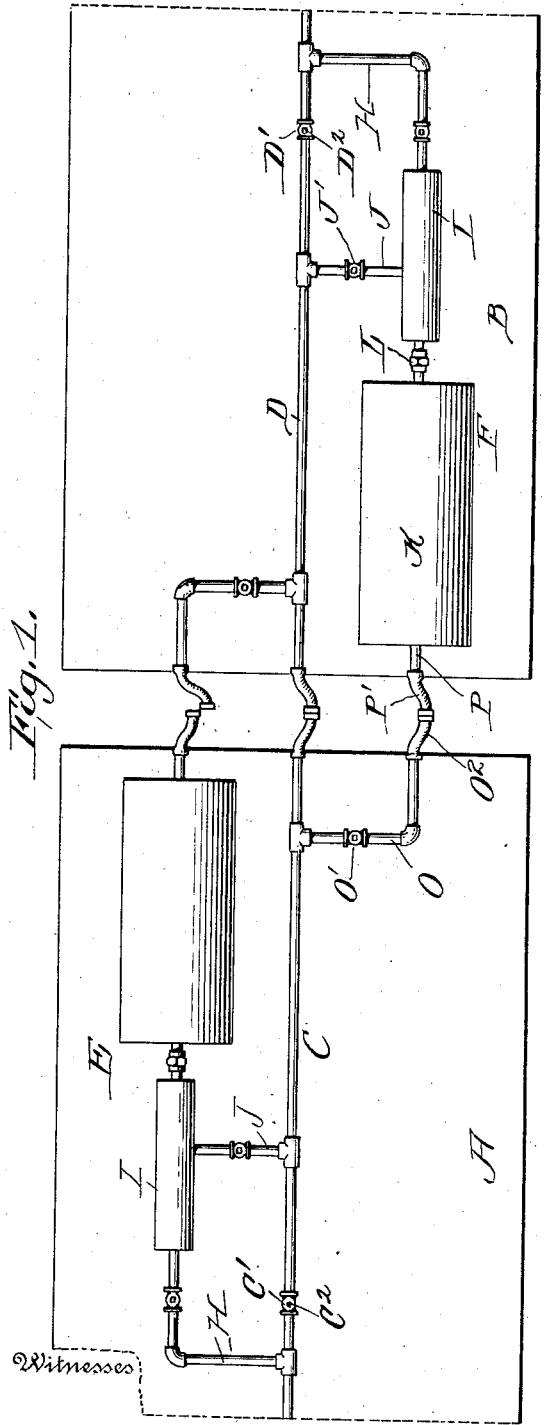
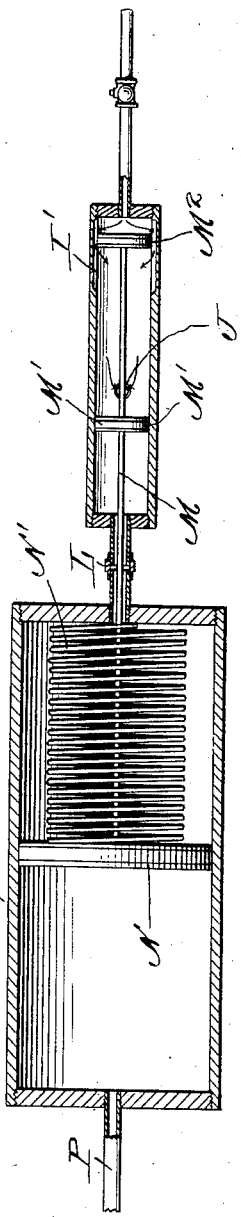

UNITED STATES PATENT OFFICE.

CHARLES W. CARROLL, OF KOLA, MISSISSIPPI.

VALVE FOR AIR-BRAKE SYSTEMS.

1,011,318.  Specification of Letters Patent.  Patented Dec. 12, 1911.

Application filed June 24, 1910. Serial No. 568,724.

*To all whom it may concern:*

Be it known that I, CHARLES W. CARROLL, a citizen of the United States, residing at Kola, in the county of Covington and State of Mississippi, have invented a new and useful Improvement in Valves for Air-Brake Systems, of which the following is a specification.

The object of my invention is to provide a valve which is normally held opened by a pressure cylinder connected to the main air pipe in such a manner that when the couplings between the cars are pulled apart, the pressure in the cylinder will be reduced, so as to allow the pressure to close the valve.

With this and other objects in view, the invention consists in the novel features of construction, combination and arrangement of parts, hereinafter fully described and pointed out in the claim.

In the drawing forming a part of this specification: Figure 1 is a diagrammatic view of an air brake system showing my improved valve. Fig. 2 is a longitudinal section through the valve proper and pressure cylinder.

In the drawing A and B indicate a pair of cars having the usual train pipes C and D and arranged under each end of the cars is my improved valve and pressure cylinder, as clearly shown at E and F.

Connected to the train pipe of each of the cars is a branch pipe H, which is connected to a valve casing I having a pipe J connecting the same to the train pipe, as clearly shown and said pipe is provided with a valve J'. The casing I is connected to a pressure cylinder K by pipe sections L, and mounted within the casing I is a valve stem M having spaced valves M', M² and said stem extends through the pipe section L and is connected to a piston N mounted within the cylinder K which is prevented from bumping the head of the cylinder by a coil spring N'. The walls of the casing I are provided with passages I' through which the air is adapted to pass when the valves are in the position shown.

Extending outwardly from the respective train pipes C and D are branch pipes O provided with check valves O' and having couplings O² adapted to coact with couplings P' of pipes P extending outwardly from the ends of the cylinders K so that air will enter the cylinders K and hold the pistons in the position shown, which will hold the valves M', M² in such a position that the air will enter the branch pipes H and pass through the casing I and out through the pipes J to the main line. If the couplings should be detached, the pressure on the cylinder K is reduced which allows the pressure to move the valves M', M² which will shift the same in such a position that the passages I' will be closed.

Assuming that the pipes are coupled in the manner shown in Fig. 1 and that the air through the main train pipe D is traveling from right to left it will be noted that the cylinder K is in communication with the train pipe by reason of the coupling of the hose sections O² and P'. It will also be noted that in the train pipes C and D are valves D' and C' respectively, the stems of which have portions D² and C², respectively, which are adapted to be turned by a suitable wrench in order to open and close these valves. With the valve D' closed and the air traveling in the direction mentioned it will pass around said valve through the casing I, the valve M² being in open position, and the air will then pass back to the train pipe D through the pipe J and through the valve J'. The air will also pass through the pipe O and the valve O', and the couplings O² and P' into the cylinder K and will hold the piston N in the position shown in Fig. 2. It will be understood that when the cars are first coupled together the valve D' is open in order to admit air pressure to the cylinder K, thus moving the piston into the position shown in Fig. 2. This establishes communication through the cylinder I around the valve M², and the valve D' is then closed.

Having thus fully described my invention, what I claim as new and desire to secure by Letters Patent is:—

A valve for air brake systems comprising a valve casing having an inlet adapted to be connected to the train pipe, and an outlet adapted to be connected to the train pipe, said casing being provided with passages at one end, a valve stem carrying spaced valves, a pressure cylinder connected to said valve casing, a piston working in said pressure cylinder connected to said valve stem, and a pipe carrying a coupler connected to said pressure cylinder adapted to coact with the valve of the adjacent car.

C. W. CARROLL.

Witnesses:
J. H. SHREWSBURY,
R. R. WILLIAMS.

Copies of this patent may be obtained for five cents each, by addressing the "Commissioner of Patents, Washington, D. C."